US011892744B2

(12) United States Patent
Rowe et al.

(10) Patent No.: US 11,892,744 B2
(45) Date of Patent: Feb. 6, 2024

(54) BEAM DELIVERY SYSTEM

(71) Applicant: Quantinuum LLC, Broomfield, CO (US)

(72) Inventors: Mary A. Rowe, Boulder, CO (US); Michael Belt, Broomfield, CO (US); Bryan T. Spann, Broomfield, CO (US); Molly R. Krogstad, Westminster, CO (US); Robert D. Horning, Lakeville, MN (US); David A. Deen, Edina, MN (US); Michael D. Young, Broomfield, CO (US); Nathan Worts, Broomfield, CO (US)

(73) Assignee: Quantinuum LLC, Broomfield, CO (US)

( * ) Notice: Subject to any disclaimer, the term of this patent is extended or adjusted under 35 U.S.C. 154(b) by 30 days.

(21) Appl. No.: 17/316,354

(22) Filed: May 10, 2021

(65) Prior Publication Data
US 2021/0389522 A1  Dec. 16, 2021

Related U.S. Application Data

(60) Provisional application No. 63/037,482, filed on Jun. 10, 2020.

(51) Int. Cl.
*G02F 1/29* (2006.01)
*G02B 6/122* (2006.01)
(Continued)

(52) U.S. Cl.
CPC .............. *G02F 1/29* (2013.01); *G02B 6/125* (2013.01); *G02B 6/1228* (2013.01); *G02F 1/292* (2013.01);
(Continued)

(58) Field of Classification Search
CPC .................. G02B 6/125; G02B 6/1228; G02B 2006/1215; G02B 6/12016;
(Continued)

(56) References Cited

U.S. PATENT DOCUMENTS

2010/0187442 A1  7/2010  Hochberg et al.
2014/0294380 A1  10/2014  Sugiyama et al.
(Continued)

FOREIGN PATENT DOCUMENTS

WO  2019/213139 A1  11/2019
WO  2020/236574 A1  11/2020

OTHER PUBLICATIONS

Moody et al. "2022 Roadmap on integrated quantum photonics", Journal of Physics: Photonics, vol. 4, No. 1, Jan. 31, 2022. (Year: 2022).*

(Continued)

*Primary Examiner* — Michelle R Connelly
(74) *Attorney, Agent, or Firm* — ALSTON & BIRD LLP

(57) ABSTRACT

Provided is a novel beam delivery system for quantum computing applications that includes a beam delivery photonic integrated circuit on a chip and an optical relay assembly. The beam delivery photonic integrated circuit on a chip may contain one or more layers, and a layer may contain one or more inputs connecting one or more outputs. The optical relay assembly receives a beam or beams from one or more outputs from a layer of the beam delivery photonic integrated circuit. The optical relay assembly focuses each received beam on a corresponding position of an atomic object confinement apparatus.

20 Claims, 11 Drawing Sheets

Figure 1:
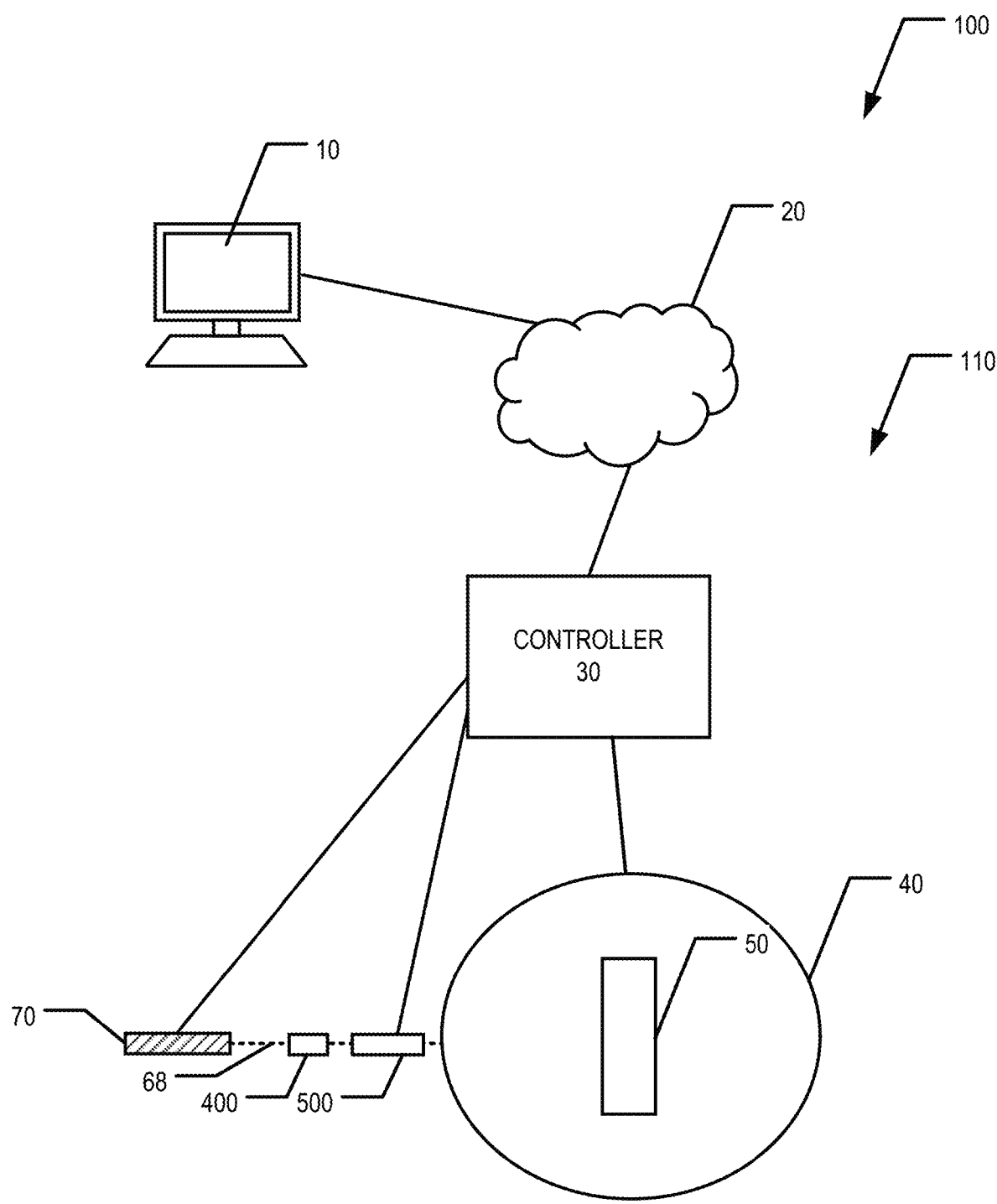

(51) Int. Cl.
  *G02B 6/125* (2006.01)
  *G02F 1/295* (2006.01)
  *G06N 10/00* (2022.01)
  *G02B 6/12* (2006.01)
  *G02B 6/26* (2006.01)
  *G06E 3/00* (2006.01)
  *G06N 10/40* (2022.01)

(52) U.S. Cl.
  CPC ............ *G02F 1/295* (2013.01); *G02F 1/2955* (2013.01); *G06E 3/005* (2013.01); *G06N 10/00* (2019.01); *G06N 10/40* (2022.01); *G02B 6/12002* (2013.01); *G02B 6/12014* (2013.01); *G02B 6/12016* (2013.01); *G02B 6/12019* (2013.01); *G02B 6/12033* (2013.01); *G02B 6/26* (2013.01); *G02B 2006/1215* (2013.01)

(58) Field of Classification Search
  CPC ...... G02B 6/12014; G02B 2006/12195; G06N 10/00; G02F 1/2955; G02F 1/292
  See application file for complete search history.

(56) References Cited

U.S. PATENT DOCUMENTS

| | | |
|---|---|---|
| 2014/0294830 A1 | 10/2014 | Lee et al. |
| 2019/0079243 A1 | 3/2019 | Lebby et al. |
| 2019/0179064 A1* | 6/2019 | Zhang ................ G02B 5/1885 |
| 2020/0166328 A1 | 5/2020 | Zhou |
| 2022/0197102 A1* | 6/2022 | Christen ................ G02F 1/212 |

OTHER PUBLICATIONS

Office Action received for European Application No. 21177257.9, dated Sep. 19, 2022, 6 pages.

Extended European Search Report issued in European Application No. 21177257.9 dated Oct. 14, 2021, 9 pages.

Kielpinski, et al. "Integrated optics architecture for trapped-ion quantum information processing," Quantum Inf Process (2016) 15: 5315-5338. DOI 10.1007/s11128-015-1162-2.

Pogorelov, et al. "Compact Ion-Trap Quantum Computing Demonstrator", PRX Quantum, vol. 2, No. 2, 2021, pp. 1-22. doi:10.1103/PRXQuantum_2.020343.

* cited by examiner

BEAM DELIVERY SYSTEM

CROSS REFERENCE TO RELATED APPLICATIONS

This application claims priority to and the benefit of U.S. Provisional Patent Application No. 63/037,482, filed Jun. 10, 2020, the entire contents of which are incorporated herein by reference.

TECHNICAL FIELD

Various embodiments relate to a beam delivery system, and specifically to a beam delivery system for quantum computing applications with a beam delivery photonic integrated circuit.

BACKGROUND

In various atomic systems, it is important to be able to deliver laser beams to dense one-or-more dimensional arrays of atomic systems at precision spacings and mode profiles. For example, trapped ion quantum computing uses laser beams to complete various functions within the trapped ion quantum computer. Such applications require that the lasers are delivered to the ion trap precisely and accurately in terms of position, spacings, mode profile, polarization, frequency, and phase.

BRIEF SUMMARY OF EXAMPLE EMBODIMENTS

Example embodiments provide a beam delivery element for quantum computing applications.

According to one aspect, a beam delivery photonic integrated circuit is provided. In an example embodiment, the beam delivery system comprises a beam delivery photonic integrated circuit, which comprises one or more optical inputs, a plurality of waveguide outputs, wherein each of the plurality of waveguide outputs are tapered, a plurality of beam paths, each beam path connecting one of the plurality of waveguide outputs to at least one of the one or more optical inputs, wherein the beam delivery photonic integrated circuit is on a chip, and an optical relay assembly, the optical relay assembly configured to receive beams provided by at least two of the plurality of waveguide outputs and focus each received beam on a corresponding one of a plurality of positions of an atomic object confinement apparatus.

In another example embodiment, the one or more of the plurality of beam paths comprises an optical element configured to tune a beam for at least one of frequency, phase, or intensity.

In another example embodiment, at least one of the plurality of waveguide outputs is directed to a photodetector.

In another example embodiment, the plurality of beam paths are defined lithographically.

In another example embodiment, the plurality of waveguide outputs are located on a polished edge of the beam delivery photonic integrated circuit.

In another example embodiment, each of the waveguide outputs are on one side of the beam delivery photonic integrated circuit and are parallel to each other.

In another example embodiment, each of the plurality of waveguide outputs are at most 150 micrometers from the next closest of the plurality of waveguide outputs.

In another example embodiment, the optical input is butt-coupled to an optical fiber providing an input beam.

In another example embodiment, a beam delivery system comprises a beam delivery photonic integrated circuit, which comprises a first waveguide layer and a second waveguide layer, the first waveguide layer, which comprises a first optical input, a plurality of first waveguide outputs, wherein the plurality of first waveguide outputs are tapered, a plurality of first beam paths, each first beam path connecting one of the plurality of first waveguide outputs to the first optical input, the second waveguide layer comprises a second optical input, a plurality of second waveguide outputs, wherein the plurality of second waveguide outputs are tapered, a plurality of second beam paths, each second beam path connecting one of the plurality of second waveguide outputs to the second optical input, wherein the beam delivery photonic integrated circuit is on a chip, an optical relay assembly, the optical relay assembly configured to receive beams provided by at least one of the plurality of first waveguide outputs and at least one of the plurality of second waveguide outputs, and the optical relay assembly further configured to focus each received beam on a corresponding plurality of positions of an atomic object confinement apparatus.

In another example embodiment, one or more of the plurality of first waveguide outputs or of the plurality of second waveguide outputs is directed to a photodetector.

In another example embodiment, one or more of the plurality of first beam paths or the plurality of second beam paths comprises an optical element configured to tune a beam for at least one of frequency, phase, or intensity.

In another example embodiment, the plurality of first waveguide outputs and the plurality of second waveguide outputs are located on a polished edge of the beam delivery photonic integrated circuit.

In another example embodiment, each of the plurality of first waveguide outputs and the plurality of second waveguide outputs are on one side of the beam delivery photonic integrated circuit and are parallel to each other.

In another example embodiment, each of the plurality of first waveguide outputs are at most 150 micrometers from the next closest of the plurality of waveguide outputs.

In another example embodiment, at least one of the first waveguide layer or the second waveguide layer comprises a dielectric material.

In another example embodiment, the first waveguide layer and the second waveguide layer are comprised of different materials.

In another example embodiment, a beam delivery system comprises a beam delivery photonic integrated circuit comprising, a plurality of optical inputs, a plurality of waveguide outputs, wherein the plurality of waveguide outputs are tapered, a plurality of beam paths, each beam path connecting one of the plurality of waveguide outputs to only one of the plurality of waveguide inputs, wherein the beam delivery photonic integrated circuit is on a chip, an optical relay assembly, the optical relay assembly configured to receive beams provided by at least two of the plurality of waveguide outputs and focus each received beam on a corresponding plurality of positions of an atomic object confinement apparatus.

In another example embodiment, one or more of the plurality of beam paths comprises an optical element configured to tune a beam for at least one of frequency, phase, or intensity.

In another example embodiment, at least one of the plurality of waveguide outputs is directed to a photodetector.

In another example embodiment, the plurality of beam paths are defined lithographically.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

FIG. 1 provides a schematic diagram of an example trapped atomic object quantum computer system, in accordance with an example embodiment.

Figure 2:
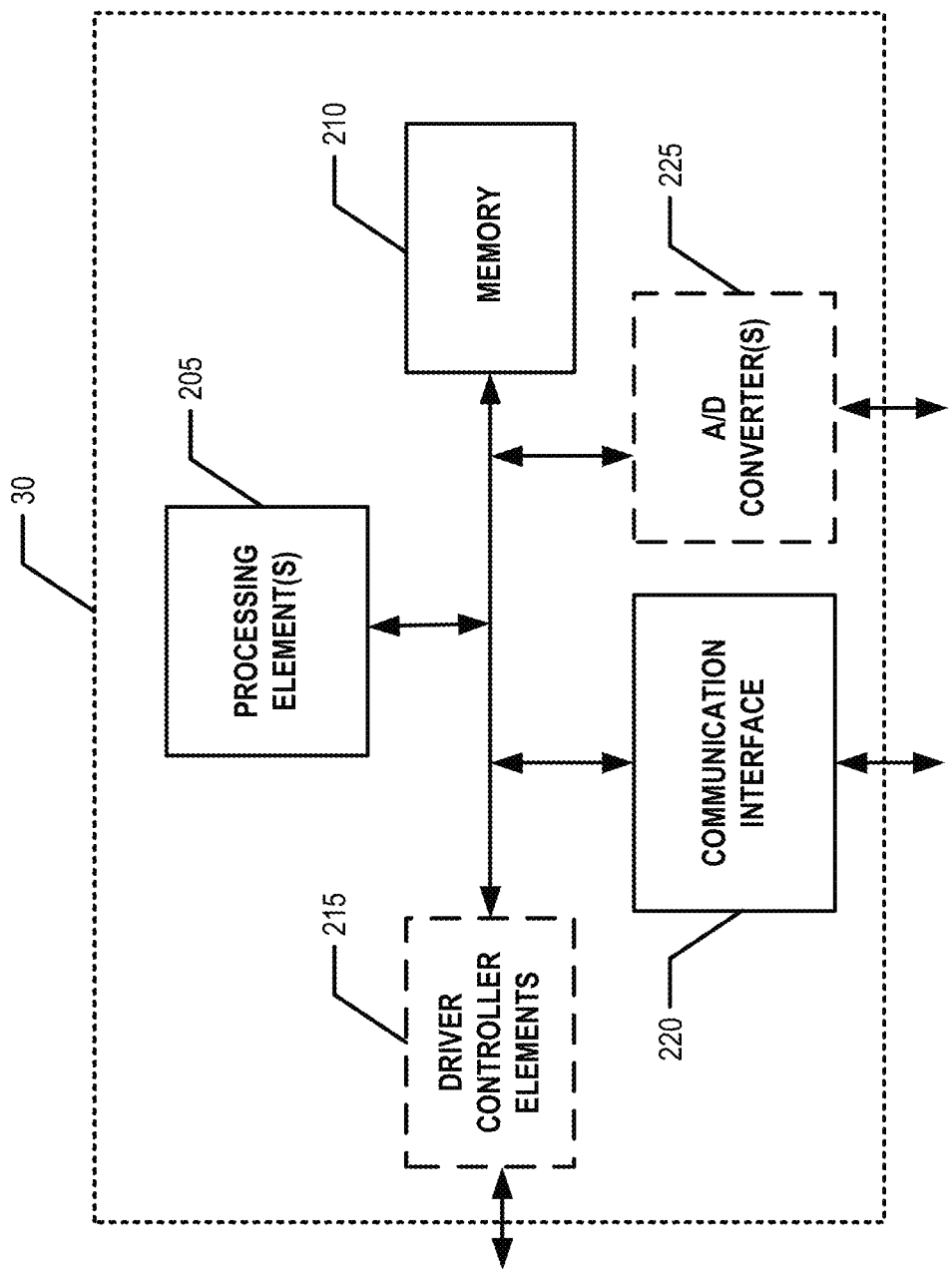

FIG. 2 provides a schematic diagram of an example controller that may be used in accordance with an example embodiment.

Figure 3:
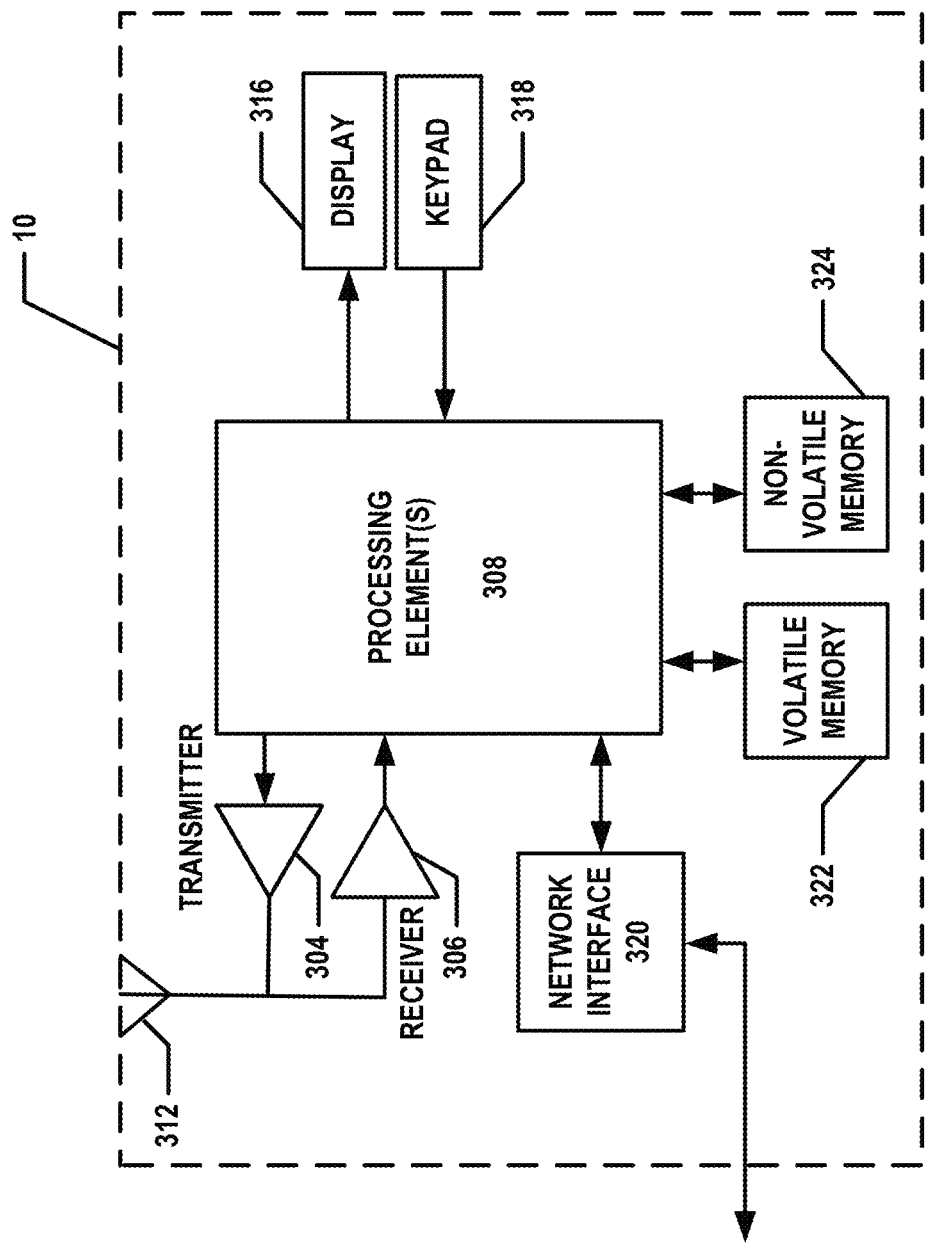

FIG. 3 provides a schematic diagram of an example computing entity that may be used in accordance with an example embodiment.

Figure 4:
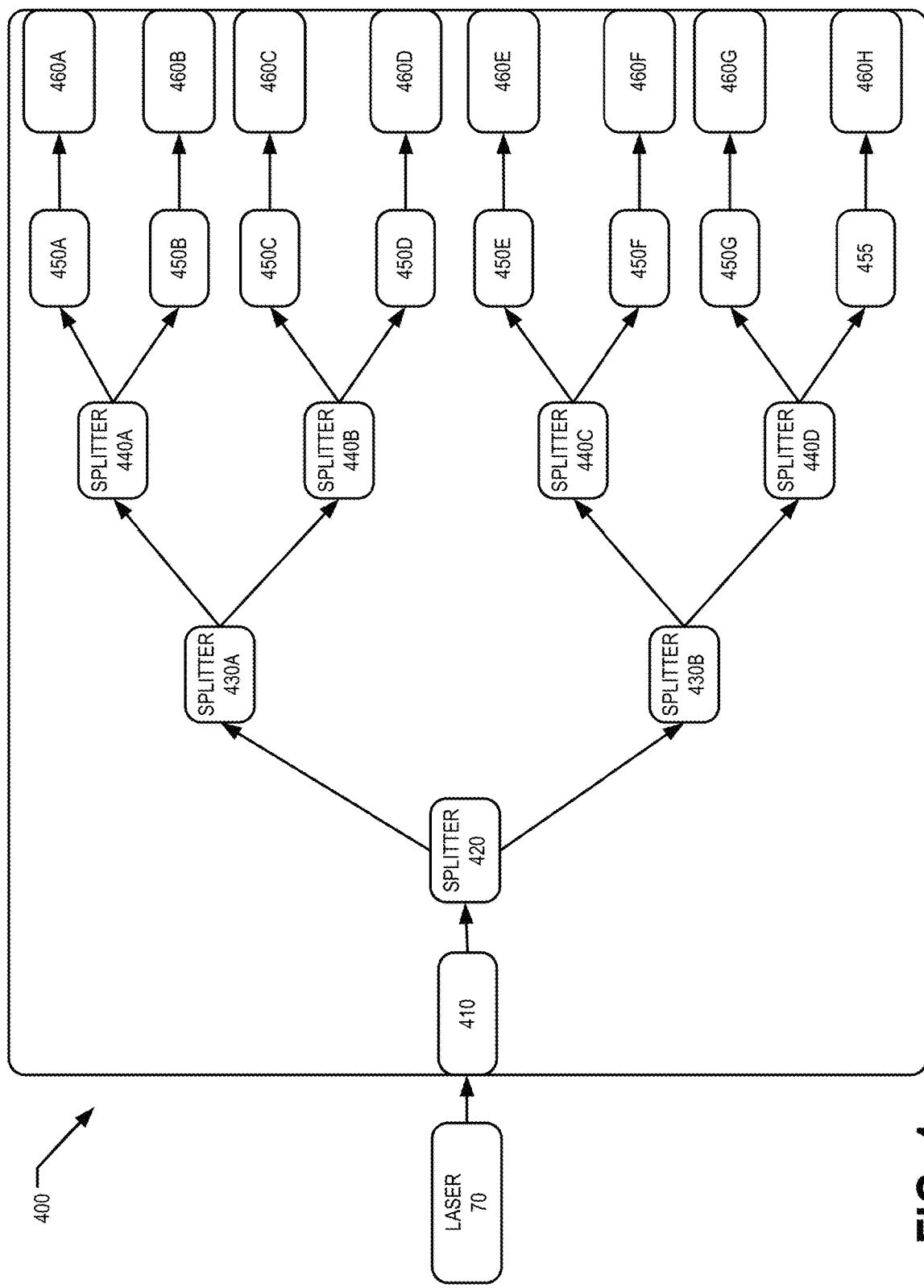

FIG. 4 provides a block diagram of an example beam delivery photonic integrated circuit, in accordance with an example embodiment.

Figure 4A:
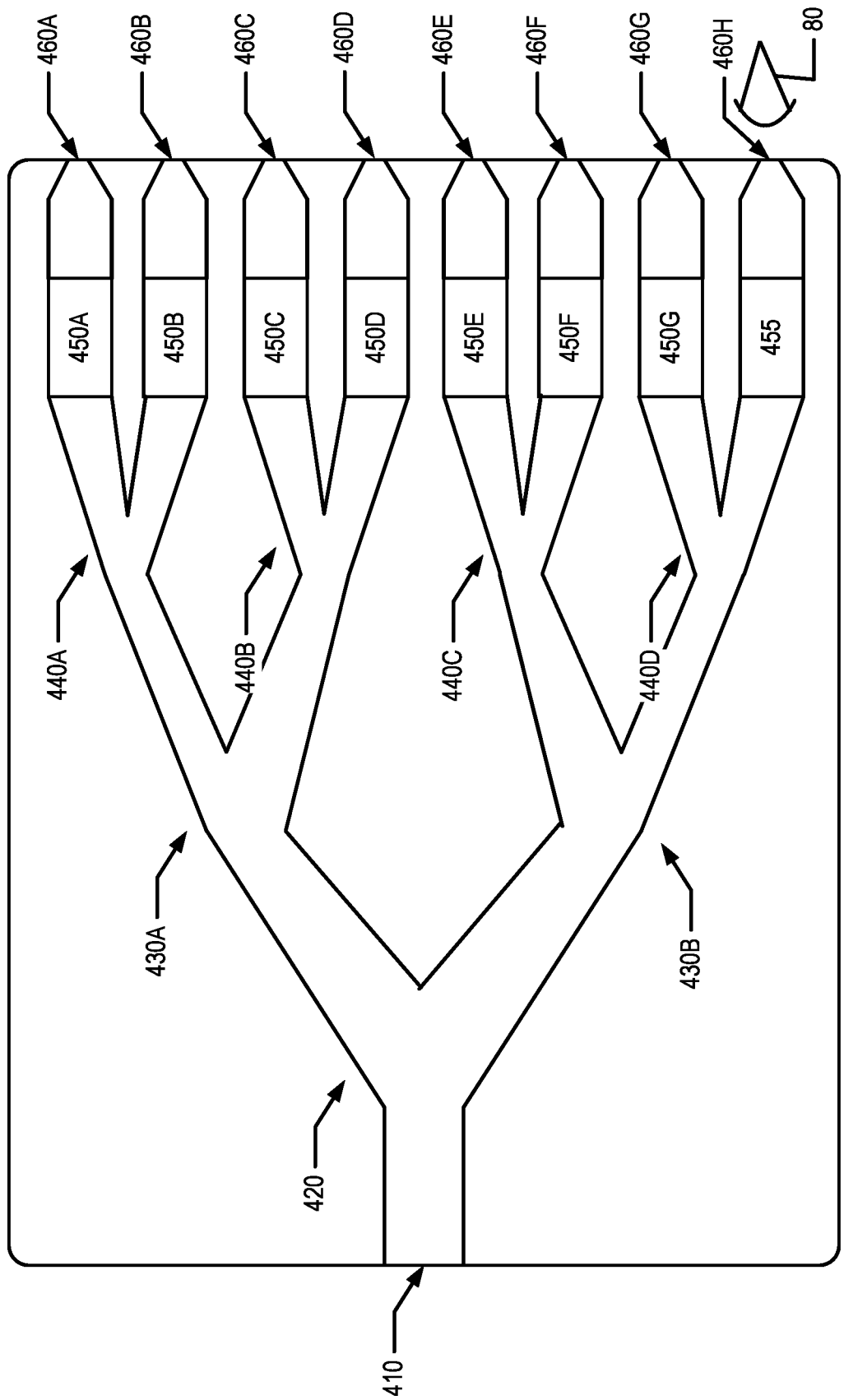

FIG. 4A provides a schematic diagram of the example beam delivery photonic integrated circuit, in accordance with an example embodiment.

Figure 5:
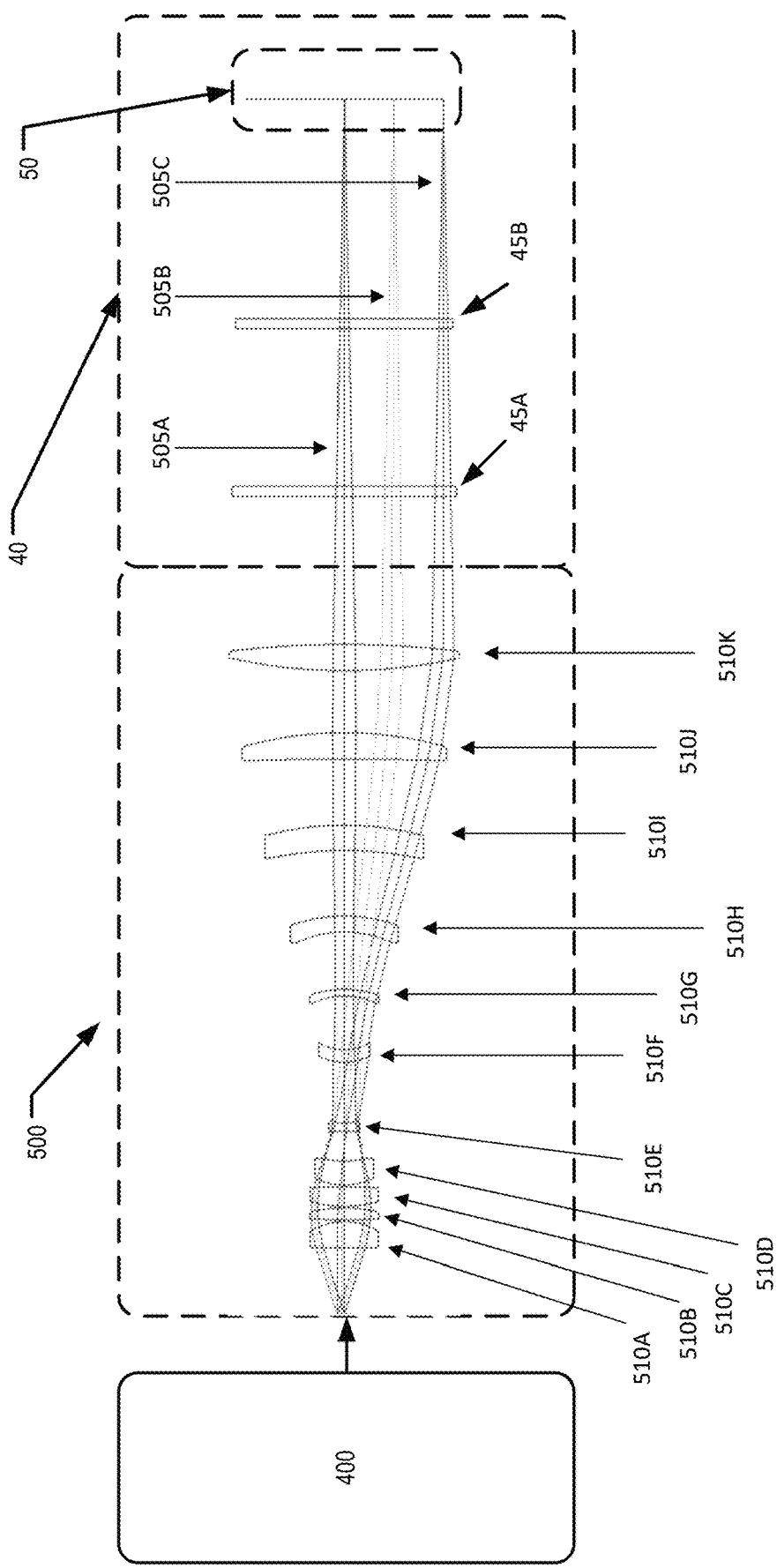

FIG. 5 illustrates an example optical relay assembly, in accordance with an example embodiment.

Figure 6:
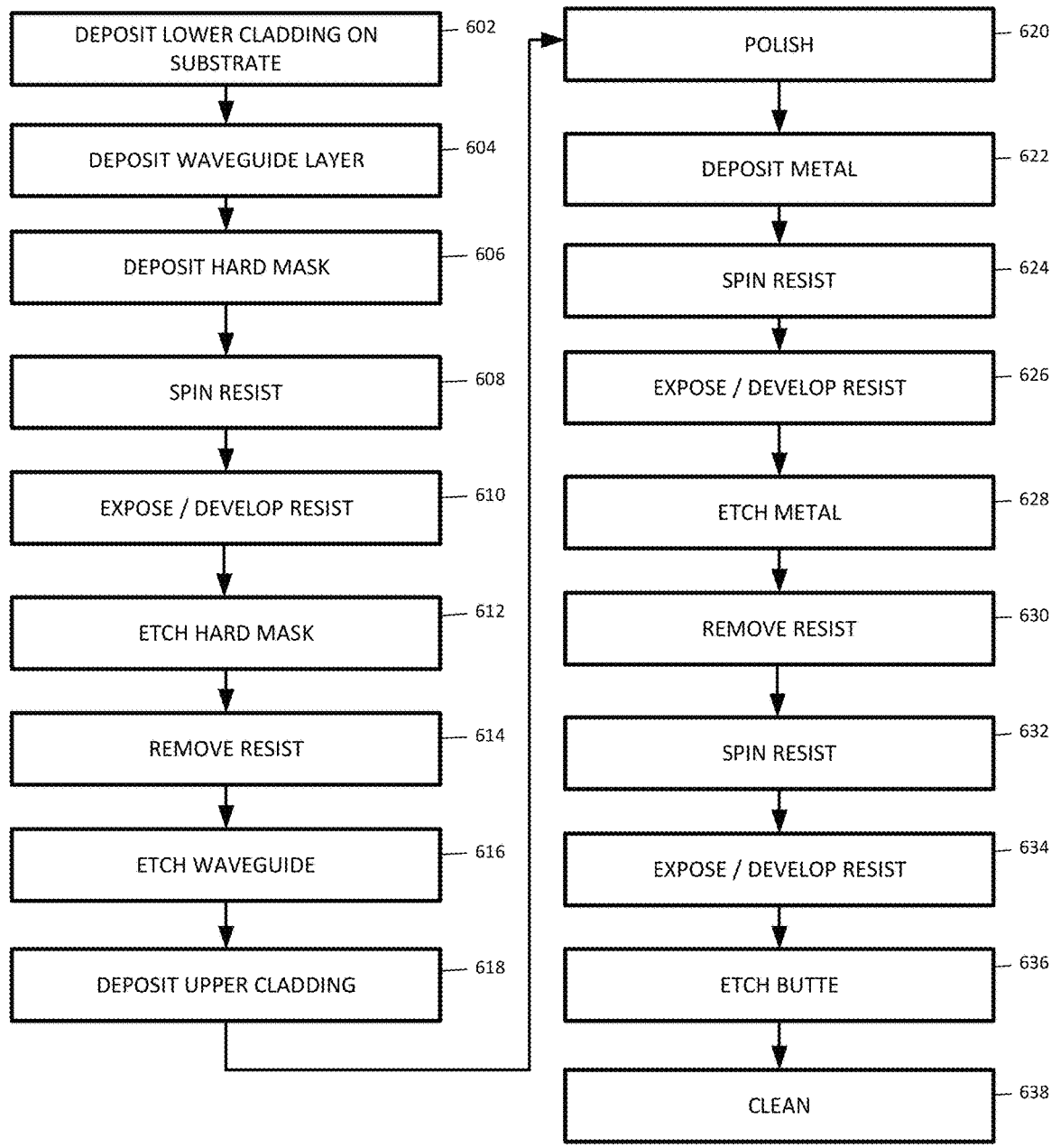

FIG. 6 provides a flowchart illustrating various processes, procedures, and/or operations performed in fabricating a beam delivery photonic integrated circuit, in accordance with an example embodiment.

Figure 7C:
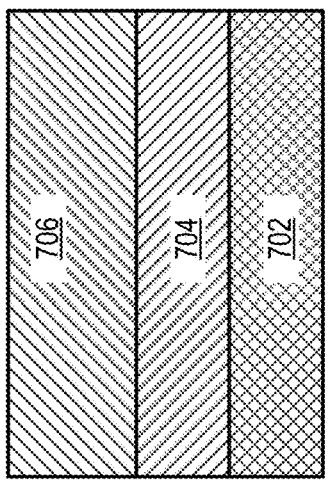
Figure 7F:
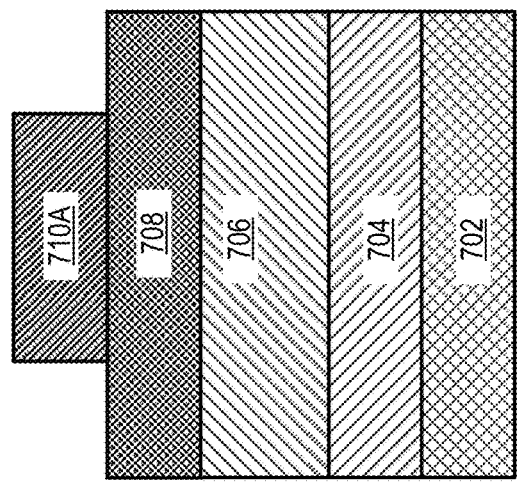
Figure 7B:
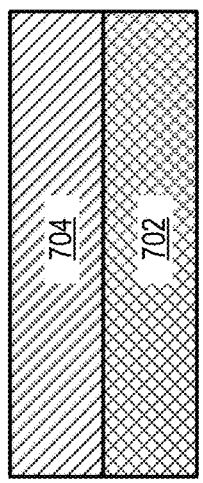
Figure 7E:
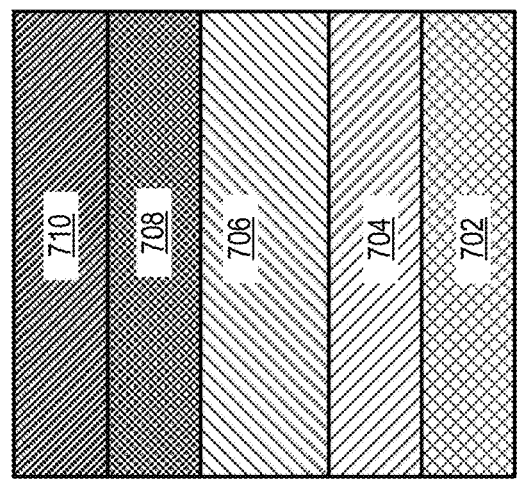
Figure 7A:
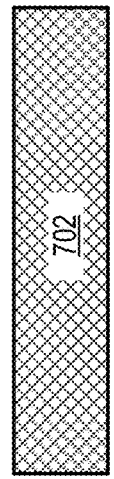
Figure 7D:
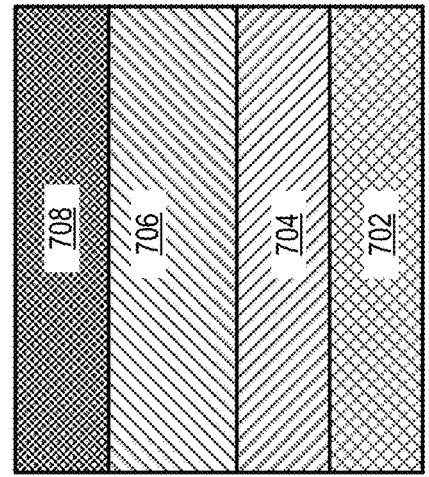
Figure 7G:
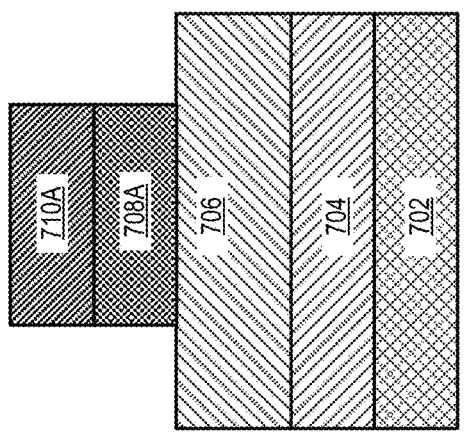
Figure 7H:
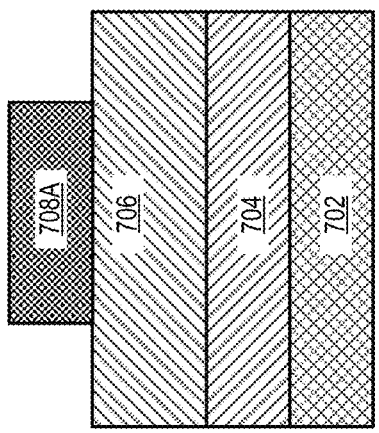
Figure 7I:
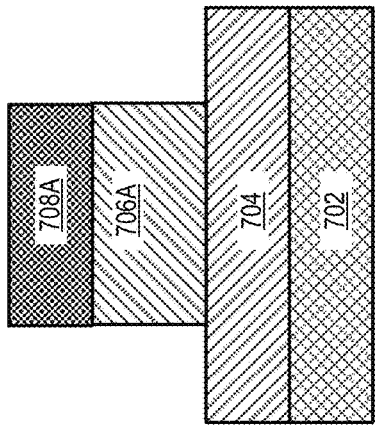
Figure 7J:
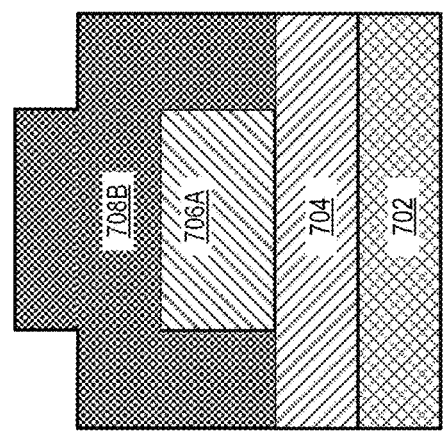
Figure 7K:
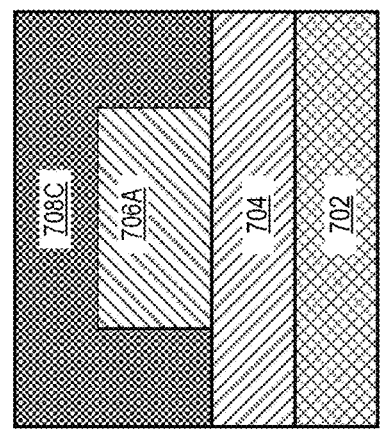
Figure 7L:
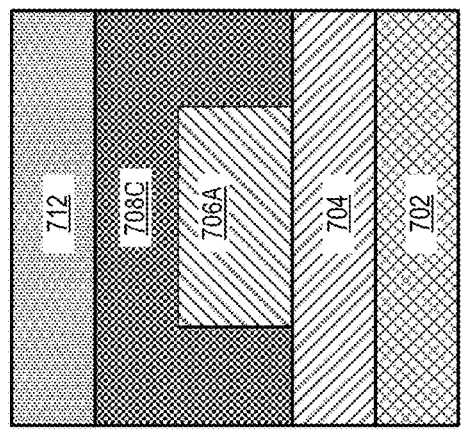
Figure 7M:
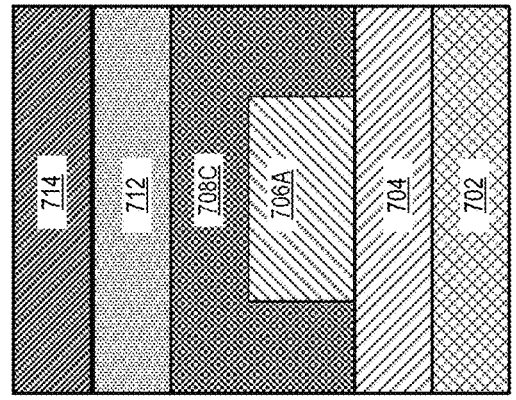
Figure 7N:
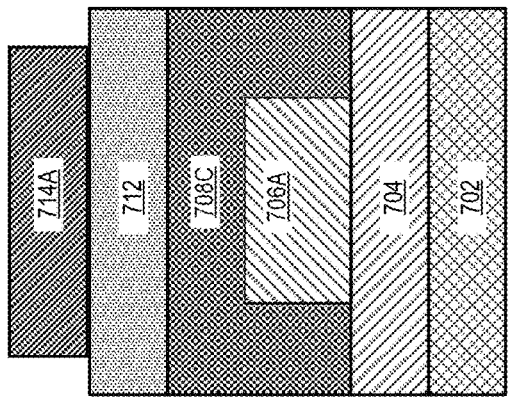
Figure 7O:
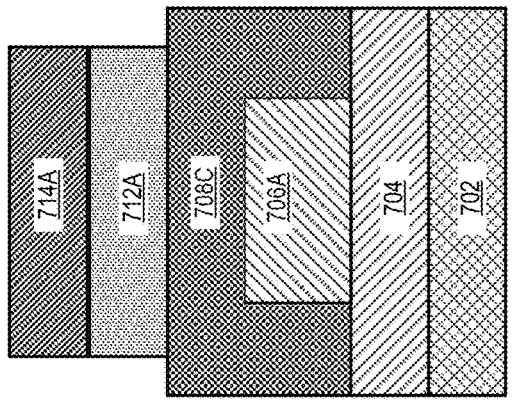
Figure 7P:
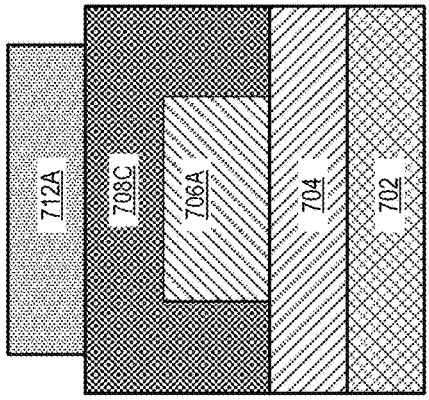
Figure 7Q:
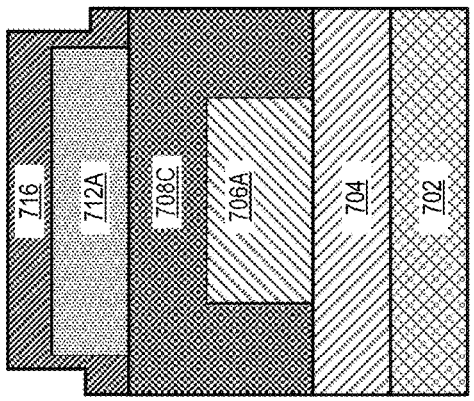
Figure 7R:
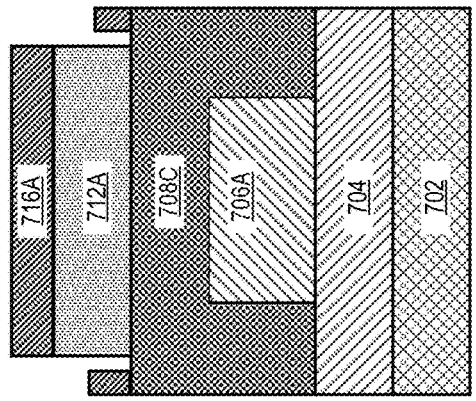
Figure 7T:
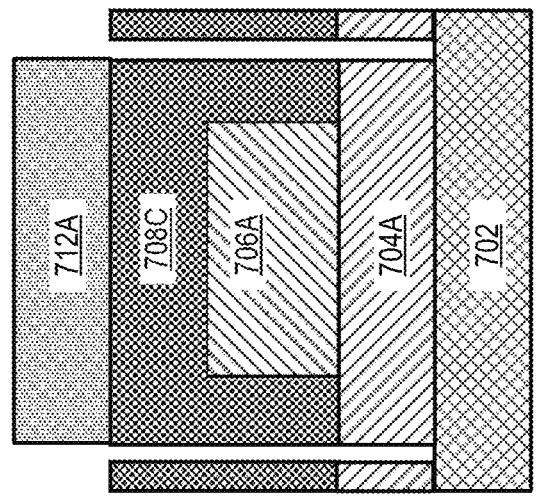

FIGS. 7A-7T provide cross-sectional views of various stages of fabricating a beam delivery photonic integrated circuit, in accordance with an example embodiment.

DETAILED DESCRIPTION OF SOME EXAMPLE EMBODIMENTS

The present invention now will be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. The term "or" (also denoted "/") is used herein in both the alternative and conjunctive sense, unless otherwise indicated. The terms "illustrative" and "exemplary" are used to be examples with no indication of quality level. The terms "generally" and "approximately" refer to within engineering and/or manufacturing limits and/or within user measurement capabilities, unless otherwise indicated. Like numbers refer to like elements throughout.

As described above, in various atomic systems, it is important to be able to precisely and accurately, in terms of position, spacings, mode profile, polarization, frequency, and/or phase, deliver one or more laser beams to the atomic system. For example, in atomic systems such as atomic clocks, Bose-Einstein condensate systems, trapped ion systems, and/or other atomic systems, precise and accurate laser beam delivery is important for various uses of the system, manipulating the system, and/or the like. Various example embodiments corresponding to trapped atomic object (e.g., atoms, ions) quantum computer systems will now be described in more detail.

Exemplary Quantum Computer System

FIG. 1 provides a schematic diagram of an example trapped atomic object quantum computer system 100, in accordance with an example embodiment. In various embodiments, the quantum computer system 100 comprises a computing entity 10 and a quantum computer 110. In various embodiments, a controller 30 of the quantum computer 110 may be in communication with the computing entity 10 via one or more wired and/or wireless networks 20. In various embodiments, the quantum computer 110 comprises the controller 30, a cryo and/or vacuum chamber 40 enclosing a atomic object confinement apparatus 50 (e.g., an ion trap and/or the like), one or more manipulation sources, one or more laser systems 70, and/or the like. In various embodiments, the atomic object confinement apparatus 50 is a confinement apparatus configured to atomic object confinement apparatus one or more atomic objects therein and the manipulation sources are configured to provide manipulation signals to one or more portions of the atomic object confinement apparatus 50 via optical paths. In various embodiments, the manipulation signals may be used to initialize one or more atomic objects into a qubit space, perform cooling operations, perform measurement operations, provide one or more gate signals, and/or the like. In various embodiments, the manipulation sources comprise one or more laser systems 70 is configured to provide one or more manipulation signals (e.g., gate signals) to one or more portions of the atomic object confinement apparatus 50 to enact one or more quantum gates (e.g., quantum logic gates). In various embodiments, the quantum gates may be one qubit gates, two qubit gates, and/or the like. In various embodiments, the one or more gate signals may be provided to the one or more portions of the atomic object confinement apparatus 50 via optical path(s) 68, which may include beam delivery photonic integrated circuit 400 and optical relay assembly 500. In various embodiments, the atomic objects confined or trapped within the atomic object confinement apparatus 50 are ions, atoms, and/or the like. For example, in an example embodiment, an atomic object is an ytterbium ion. In an example embodiment, an atomic object comprises a qubit ion and a corresponding cooling ion.

In various embodiments, a computing entity 10 is configured to allow a user to provide input to the quantum computer system 100 (e.g., via a user interface of the computing entity 10) and receive, view, and/or the like output from the quantum computer system 100. The computing entity 10 may be in communication with the controller 30 via one or more wired or wireless networks 20. For example, the computing entity 10 may be configured to provide quantum circuits to the controller 30 for execution by the quantum computer 110 and the controller 30 may provide the results of executing one or more quantum circuits to the computing entity 10.

In various embodiments, the controller 30 is configured to control the atomic object confinement apparatus 50, cooling and/or vacuum systems (not shown) controlling the temperature and pressure within the cryo and/or vacuum chamber 40, manipulation sources, laser system 70, servo, and/or other components of the quantum computer 110 (e.g., an optical collection system configured for "reading" the output of the quantum computer). In various embodiments, the controller 30 is configured to control various components of the quantum computer 110 in accordance with executable instructions, command sets, and/or the like provided by the computing entity 10 and/or generated by the controller 30. In various embodiments, the controller 30 is configured to receive output from the quantum computer 110 (e.g., from an optical collection system) and provide the output and/or the result of processing the output to the computing entity 10.

Exemplary Controller

In various embodiments, a quantum computer 110 comprises a controller 30 configured to control various elements of the quantum computer 110. In various embodiments, a controller 30 may be configured to cause a quantum computer 110 to perform various operations (e.g., computing operations such as gate operations, cooling operations, transport operations, qubit interaction operations, qubit measurement operations, leakage suppression operations, and/or the like). For example, the controller 30 may be configured to cause manipulation sources to provide manipulation signals to atomic objects confined and/or trapped within the atomic object confinement apparatus 50. For example, the controller 30 may be configured to cause the laser system 70, possibly in coordination with servo system, to provide one or more gate signals to one or more atomic objects confined and/or trapped within the atomic object confinement apparatus 50 so as to enact, for example, one or more quantum gates. In various embodiments, the controller 30 may be configured to control a cryogenic system and/or vacuum system controlling the temperature and pressure within the cryogenic and/or vacuum chamber 40, manipulation sources, and/or other systems controlling the environmental conditions (e.g., temperature, humidity, pressure, and/or the like) within the cryogenic and/or vacuum chamber 40 and/or configured to manipulate and/or cause a controlled evolution of quantum states of one or more atomic objects within the atomic object confinement apparatus 50.

As shown in FIG. 2, in various embodiments, the controller 30 may comprise various controller elements including processing element(s) 205, memory 210, driver controller elements 215, a communication interface 220, analog-digital converter 225, and/or the like. For example, the processing element(s) 205 may comprise programmable logic devices (CPLDs), microprocessors, coprocessing entities, application-specific instruction-set processors (ASIPs), integrated circuits, application specific integrated circuits (ASICs), field programmable gate arrays (FPGAs), programmable logic arrays (PLAs), hardware accelerators, other processing devices and/or circuitry, and/or the like, and/or controllers. The term circuitry may refer to an entirely hardware embodiment or a combination of hardware and computer program products. In an example embodiment, the processing element(s) 205 of the controller 30 comprises a clock and/or is in communication with a clock.

For example, the memory 210 may comprise non-transitory memory such as volatile and/or non-volatile memory storage such as one or more of as hard disks, ROM, PROM, EPROM, EEPROM, flash memory, MMCs, SD memory cards, Memory Sticks, CBRAM, PRAM, FeRAM, RRAM, SONOS, racetrack memory, RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. In various embodiments, the memory 210 may store qubit records corresponding the qubits of quantum computer (e.g., in a qubit record data store, qubit record database, qubit record table, and/or the like), a calibration table, an executable queue, computer program code (e.g., in a one or more computer languages, specialized controller language(s), and/or the like), and/or the like. In an example embodiment, execution of at least a portion of the computer program code stored in the memory 210 (e.g., by a processing element(s) 205) causes the controller 30 to perform one or more steps, operations, processes, procedures and/or the like described herein for tracking the phase of an atomic object within an atomic system and causing the adjustment of the phase of one or more manipulation sources and/or signal(s) generated thereby.

In various embodiments, the driver controller elements 215 may include one or more drivers and/or controller elements each configured to control one or more drivers. In various embodiments, the driver controller elements 215 may comprise drivers and/or driver controllers. For example, the driver controllers may be configured to cause one or more corresponding drivers to be operated in accordance with executable instructions, commands, and/or the like scheduled and executed by the controller 30 (e.g., by the processing element(s) 205). In various embodiments, the driver controller elements 215 may enable the controller 30 to operate a laser system 70, servo, manipulation sources, vacuum and/or cryogenic systems, and/or the like. In various embodiments, the drivers may be laser drivers; microwave drivers; vacuum component drivers; cryogenic and/or vacuum system component drivers; current drivers, and/or the like. For example, the drivers and/or driver controllers may be configured to cause a magnetic field generation device (e.g., comprising circuitry coupled to a voltage source (e.g., a current driver or voltage driver), permanent magnet(s), and/or a combination thereof) to generate a magnetic field having a particular direction and magnitude at one or more positions of the atomic object confinement apparatus 50. In various embodiments, a plurality of positions of the atomic object confinement apparatus 50 (e.g., atomic object confinement apparatus zones) may be defined. In various embodiments, the controller 30 comprises means for communicating and/or receiving signals from one or more optical receiver components such as cameras, MEMs cameras, CCD cameras, photodiodes, photomultiplier tubes, and/or the like. For example, the controller 30 may comprise one or more analog-digital converter element(s) 225 configured to receive signals from one or more optical receiver components, calibration sensors, and/or the like.

In various embodiments, the controller 30 may comprise a communication interface 220 for interfacing and/or communicating with a computing entity 10. For example, the controller 30 may comprise a communication interface 220 for receiving executable instructions, command sets, and/or the like from the computing entity 10 and providing output received from the quantum computer 110 (e.g., from an optical collection system) and/or the result of a processing the output to the computing entity 10. In various embodiments, the computing entity 10 and the controller 30 may communicate via a direct wired and/or wireless connection and/or one or more wired and/or wireless networks 20.

Exemplary Computing Entity

FIG. 3 provides an illustrative schematic diagram of an example computing entity 10 that can be used in conjunction with embodiments of the present invention. In various embodiments, a computing entity 10 is configured to allow a user to provide input to the quantum computer 110 (e.g., via a user interface of the computing entity 10) and receive, display, analyze, and/or the like output from the quantum computer 110. For example, a user may operate a computing entity 10 to generate and/or program a quantum algorithm and/or quantum circuit (e.g., that includes a D-state AC-Stark shift gate) that may be provided such that the controller 30 may receive the quantum algorithm and/or quantum circuit and cause the quantum computer 110 to perform the quantum algorithm and/or quantum circuit.

As shown in FIG. 3, a computing entity 10 can include an antenna 312, a transmitter 304 (e.g., radio), a receiver 306 (e.g., radio), and a processing element 308 that provides signals to and receives signals from the transmitter 304 and receiver 306, respectively, which may collectively be referred to a transceiver. The signals provided to and received from the transmitter 304 and the receiver 306, respectively, may include signaling information/data in accordance with an air interface standard of applicable wireless systems to communicate with various entities, such as a controller 30, other computing entities 10, and/or the like. In this regard, the computing entity 10 may be capable of operating with one or more air interface standards, communication protocols, modulation types, and access types. For example, the computing entity 10 may be configured to receive and/or provide communications using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the computing entity 10 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra wideband (UWB), infrared (IR) protocols, near field communication (NFC) protocols, Wibree, Bluetooth protocols, wireless universal serial bus (USB) protocols, and/or any other wireless protocol. The computing entity 10 may use such protocols and standards to communicate using Border Gateway Protocol (BGP), Dynamic Host Configuration Protocol (DHCP), Domain Name System (DNS), File Transfer Protocol (FTP), Hypertext Transfer Protocol (HTTP), HTTP over TLS/SSL/Secure, Internet Message Access Protocol (IMAP), Network Time Protocol (NTP), Simple Mail Transfer Protocol (SMTP), Telnet, Transport Layer Security (TLS), Secure Sockets Layer (SSL), Internet Protocol (IP), Transmission Control Protocol (TCP), User Datagram Protocol (UDP), Datagram Congestion Control Protocol (DCCP), Stream Control Transmission Protocol (SCTP), HyperText Markup Language (HTML), and/or the like.

Via these communication standards and protocols, the computing entity 10 can communicate with various other entities using concepts such as Unstructured Supplementary Service information/data (USSD), Short Message Service (SMS), Multimedia Messaging Service (MMS), Dual-Tone Multi-Frequency Signaling (DTMF), and/or Subscriber Identity Module Dialer (SIM dialer). The computing entity 10 can also download changes, add-ons, and updates, for instance, to its firmware, software (e.g., including executable instructions, applications, program modules), and operating system.

The computing entity 10 may also comprise a user interface device comprising one or more user input/output interfaces (e.g., a display 316 and/or speaker/speaker driver coupled to a processing element(s) 308 and a touch screen, keyboard, mouse, and/or microphone coupled to a processing element(s) 308). For instance, the user output interface may be configured to provide an application, browser, user interface, interface, dashboard, screen, webpage, page, and/or similar words used herein interchangeably executing on and/or accessible via the computing entity 10 to cause display or audible presentation of information/data and for interaction therewith via one or more user input interfaces. The user input interface can comprise any of a number of devices allowing the computing entity 10 to receive data, such as a keypad 318 (hard or soft), a touch display, voice/speech or motion interfaces, scanners, readers, or other input device. In embodiments including a keypad 318, the keypad 318 can include (or cause display of) the conventional numeric (0-9) and related keys (#, *), and other keys used for operating the computing entity 10 and may include a full set of alphabetic keys or set of keys that may be activated to provide a full set of alphanumeric keys. In addition to providing input, the user input interface can be used, for example, to activate or deactivate certain functions, such as screen savers and/or sleep modes. Through such inputs the computing entity 10 can collect information/data, user interaction/input, and/or the like.

The computing entity 10 can also include volatile memory or storage 322 and/or non-volatile memory or storage 324, which can be embedded and/or may be removable. For instance, the non-volatile memory may be ROM, PROM, EPROM, EEPROM, flash memory, MMCs, SD memory cards, Memory Sticks, CBRAM, PRAM, FeRAM, RRAM, SONOS, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. The volatile and non-volatile storage or memory can store databases, database instances, database management system entities, data, applications, programs, program modules, scripts, source code, object code, byte code, compiled code, interpreted code, machine code, executable instructions, and/or the like to implement the functions of the computing entity 10.

Exemplary Laser System and Beam Delivery Photonic Integrated Circuit

A beam delivery photonic integrated circuit 400 may have one or more inputs and has a plurality of outputs. The input(s) and outputs may be connected by waveguides fabricated on a chip, which may be lithographically fabricated on a chip. The beam paths connecting the input(s) and outputs as well as the spacing of the input(s) and outputs may be defined lithographically. The outputs may be a dense set of outputs for output of parallel laser beams. The dense set of outputs may be on a single chip and may allow for the positions of the outputs to be fixed relative to each other, which may provide for greater system stability. A fixed spacing may eliminate the need to make individual optical path adjustments for each beam. The dimensions of the chip, including the input(s) and the outputs may be a few centimeters on each side. The number of outputs may be increased or decreased by adjusting a number of cascading splitters in the beam delivery photonic integrated circuit. The device, however, does not become more complex with the additional beams, which is due in part to the fixed spacing of the outputs. For example, a chip with an edge length of 4 millimeters may provide 100 parallel beams from 100 outputs. With the small size, the chip may be packaged with a shared imaging system of optical relay assembly 500. Additionally, one or more of the beam delivery photonic integrated circuits may be used together with a shared imaging system to create an array. For example, two beam delivery photonic integrated circuits, each with a 100 beam outputs, could be used together orthogonally to create a 100×100 array. Additionally, the beam delivery photonic integrated circuit 400 may have one or more layers of input(s) and outputs.

As depicted in FIG. 1, a beam delivery photonic integrated circuit 400 may be located external to the vacuum chamber 40 or, alternatively, a beam delivery photonic integrated circuit may be located inside the vacuum chamber 40.

In various embodiments, a laser system 70 provides one or more gate signals to one or more portions of an atomic object confinement apparatus 50 having atomic objects confined and/or trapped therein for use as qubits of a quantum computer 110. For example, if the qubit space is defined based on hyperfine splitting of energy levels of the atomic objects, the frequency of the laser beam may be on the order of 100 MHz to 100 GHz.

A beam delivery photonic integrated circuit 400 may include one or more inputs and two or more outputs. As depicted in FIG. 4, input(s) and outputs are connected with a plurality of beam paths. Each beam path may include one or more beam splitters, and at least one of the beam paths comprises a modulator. The beam splitters may be configured in a cascading arrangement. For example, the output of a first beam splitter may be connected to the input of another beam splitter. In various embodiments, an input may be connected to an output with a beam path without any splitters. Additionally, or alternatively, a beam delivery photonic integrated circuit 400 may include one input to only one output. Additionally, or alternatively, there may be multiple inputs and outputs each connected by a beam path in the beam delivery photonic integrated circuit 400.

FIG. 4 provides a block diagram of an example beam delivery photonic integrated circuit 400 in accordance with an example embodiment, and FIG. 4 provides an example of one waveguide layer, which may be in a single plane. The beam delivery photonic integrated circuit 400 may be a photonic integrated circuit fabricated on a chip. The waveguides in one waveguide layer of the beam delivery photonic integrated circuit 400, as described herein, may be fabricated from one or more deposited films of waveguide material. The fabrication may use lithography, which may allow for defined geometry of inputs, beam paths, and outputs. The splitters may be made from a single material and configured based on the properties of the material and wavelength of light being used. In various embodiments, there may be multiple waveguide layers such that more than one waveguide layer illustrated in FIG. 4 are in a beam delivery photonic integrated circuit 400. In an alternative embodiment, there may be a first waveguide layer and a second waveguide layer. In yet another alternative embodiment, there are more than two waveguide layers.

There may be linking of inputs and outputs between layers. For example, an input of a first layer may be an input into a second layer to create a link between the layers. A link between the two layers may be anywhere in the layers, such as, but not limited to, at the input of a stage of splitters or of an optical element or at the output of a splitter or of an optical element. In an alternative embodiment, an input of a first layer may be linked to the input of the second layer such that the output of the second layer is based on, among of things, the inputs to the first and second layers. In an alternative embodiment, an output of a splitter or optical element of a first layer may be linked to the input of a splitter or optical element of a second layer.

In the embodiment depicted by FIG. 4, the output of laser 70 is input to a beam delivery photonic integrated circuit 400 via optical input 410. In various embodiments, the output of laser 70 may be output on optical fiber and optical input 410 may be a single butt-coupled fiber. In alternative embodiments, the output of laser 70 may be in free-space and input into optical input 410.

After optical input 410, beam delivery photonic integrated circuit 400 may split the signal into multiple waveguides using a cascaded series of waveguide-based splitters. FIG. 4 depicts the first splitter as splitter 420, which has two outputs. Each of the two outputs of splitter 420 goes to another splitter, respectively splitter 430A and splitter 430B. Each of the two outputs of splitter 430A goes to another splitter, respectively splitter 440A and splitter 440B. Each of the two outputs of splitter 430B goes to another splitter, respectively splitter 440C and splitter 440D. Thus, as depicted in FIG. 4, there are three stages of splitters that cascade: a first stage of splitter 420, a second stage of splitters 430A, 430B, and a third stage of splitters 440A, 440B, 440C, and 440D. While FIG. 4 depicts three stages of splitters, other embodiments may have additional stages of cascaded splitters, such as having tens or hundreds of stages of splitters. Additionally, while FIG. 4 depicts splitters in a single plane, the splitters may be configured in a three dimensional direction such that there may be multiple stages of cascading occurring in multiple dimensions (e.g., X, Y, or Z dimensions). Additionally, or alternatively, multiple beam delivery photonic integrated circuits 400 may be provided on one chip, which may be done by isolating in the input and outputs of each beam delivery photonic integrated circuit 400 from each other.

As also depicted in FIG. 4, after the last stage of splitters (depicted as splitters 440A, 440B, 440C, and 440D in FIG. 4), a beam path may have an optical element. An optical element may allow for a beam in the beam path to be independently tuned, such as for one or more parameters, from beams in other beam paths. In one embodiment, the parameters that may be tuned include frequency, phase, and/or intensity. Additional parameters are discussed herein. In FIG. 4, all but one of the beam paths has an optical element 450 (depicted as 450A, 450B, 450C, 450D, 450E, 450F, and 450G in FIG. 4), and the one beam path without an integrated circuit element 450 may have a modulator 455 or, alternatively, may not have a modulator 455. In an example embodiment, N beams from the output of the beam delivery photonic integrated circuit 400 may each be delivered to a particular portion of the atomic object confinement apparatus 50. For example, a first beam from a first output (e.g., 460A) and a second beam from a second output (e.g., 460B) may be delivered to a first portion of the atomic object confinement apparatus 50 and an Nth beam from an Nth output may be delivered to an Nth portion of the atomic object confinement apparatus 50.

In various embodiments, an optical element 450 may be an interferometer, a phase modulator, photodetector, amplitude modulator, combiner, tapers, polarization control, lens, and/or a combination of the preceding. For example, the optical element 450 may be configured to provide for control of an output power of a beam. For example, in an example embodiment, wherein an optical element 450 is a Mach-Zehnder interferometer that provides for control of the output power of a corresponding beam, the output power of the corresponding beam may be controlled by resistively heating one arm of the Mach-Zehnder interferometer. For example, the Mach-Zehnder interferometer may act as a phase shifter to power-balance the beams. This may be referred to as thermally tuning the phase of the beam along the path to achieve the desired output power. The output of each of the Mach-Zehnder interferometers may exit the beam delivery photonic integrated circuit 400 through a corresponding output 460. In an alternative embodiment, the optical element may be a ring modulator. In various embodiments, each of the plurality of outputs 460 of the beam delivery photonic integrated circuit 400 are located and/or disposed along a single polished edge of the beam delivery photonic integrated circuit 400. Additionally, or alternatively, tapering the waveguide dimensions near an output 460 may allow for and result in a desired output beam profile, such as, for example, a desired mode field or mode profile at the output 460. The taper of each waveguide output 460 may be the same, as shown in FIG. 4A, or the taper may be different. The beam delivery photonic integrated circuit 400 may be configured to so that the stability of the beams' positions and pointing may maintain a constant intensity at the ions at the <0.1% level. Also, the power balance between the focused beams may have equal intensities at all ion zones of the atomic object confinement apparatus 50, and each beam may have a polarization purity that is 20-dB or better, in various embodiments. The beam delivery photonic integrated circuit 400 may be mechanically polished and finished and may have metal traces to define the Mach-Zehnder interferometer heater elements and their leads. As also depicted in FIG. 4, each beam path may end in an output 460 (depicted as 460A, 460B, 460C, 460D, 460E, 460F, 460G, and 460H in FIG. 4). The outputs 460 may be along a single polished edge of the beam delivery photonic integrated circuit 400. Additionally, in some embodiments, outputs 460 may be located on more than on edge.

In an example embodiment, the beam path that does not have an optical element 450 may be used to provide intensity feedback to the system. For example, the output 460H of FIG. 4 may be input into a photodetector 80 (e.g., a photodiode) or optical intensity measurement device that may measure the intensity of the beam output via output 460H. Fast power fluctuations resulting from the input beam coupling variation are common-mode to all beams and can be removed with external feedback based on just one of the output beams, such as with output 460H of FIG. 4. The modulator 455 may also be a Mach-Zehnder interferometer, in an example embodiment.

Each output 460 may be fixed (relative to the other outputs 460 and/or to the beam delivery photonic integrated circuit 400) and may provide six degrees of freedom (e.g., freedom in the space of X, Y, and Z coordinates as well as pitch, yaw, and roll). The output may be configured for alignment of an output beam with an ion array and/or with an optical relay assembly and an ion array. The spacing of the outputs 460 may be configured to match needed parameters corresponding to an atomic object confinement apparatus 50, including, but not limited to, providing a desired mode field and/or mode profile, position, polarization, frequency, phase, focus waist, and/or spacing. For example, the spacing of the outputs 460 may be configured to provide a desired relationship between the mode field diameter of a beam being emitted through an output 460 and the spacing between the output 460 and an adjacent output. Additionally, the degrees of freedom may be provided regardless of how many parallel outputs 460 there may be on a beam delivery photonic integrated circuit 400. For example, the outputs of a first beam delivery photonic integrated circuit 400 may be aligned with particular positions within a atomic object confinement apparatus 50 based on six degrees of freedom and the outputs of a second beam delivery photonic integrated circuit having twice as many outputs as the first beam delivery photonic integrated circuit may be aligned with particular positions within the atomic object confinement apparatus 50 based on six degrees of freedom. Thus, the alignment of the beam delivery photonic integrated circuit 400 with the particular positions within an atomic object confinement apparatus 50 does not increase in complexity as the number of outputs 460 of the beam delivery photonic integrated circuit 400 increases, in various embodiments. In one example, an output may be approximately 1 micrometer in diameter and outputs may be spaced approximately 150 micrometers apart.

While FIG. 4 depicts each of the splitters as a 1:2 splitter, in various embodiments a splitter may be a 1:N splitter with a splitter having one input and N outputs. Additionally, or alternatively, the cascading may or may not use splitters having the same ratios (e.g., 1:2, 1:3, 1:4, etc.).

Optical Relay Assembly

Outputs of beam delivery photonic integrated circuit 400 are provided to an optical relay assembly 500. The optical relay assembly 500 may be configured to provide a desired magnification, such as by configuring a pitch and/or mode-field diameter. As the number of beams from the beam delivery photonic integrated circuit 400 grows, the complexity of the optical relay assembly 500 may or may not increase. For example, the optical relay assembly 500 may be modified to address or correct field-dependent aberrations.

In some embodiments, laser 70 may be a monochromatic laser, which may allow for a single material (e.g., a single glass material) to be used for an optical relay assembly 500. In other embodiments, more than one material may be used to form or fabricate the optical relay assembly 500. For example, in an example embodiment wherein the laser 70 is not a monochromatic laser, the optical relay assembly 500 may be formed or fabricated from multiple materials.

FIG. 5 depicts an optical relay assembly 500. FIG. 5 illustrates an example optical relay assembly 500. The outputs of beam delivery photonic integrated circuit 400 are input into optical relay assembly 500. FIG. 5 uses three different colors (e.g., 505A, 505B, and 505C), with each color representing a beam output from one output of beam delivery photonic integrated circuit. The first group of optical elements before the aperture stop may collect light from the photonic chip in a telecentric or non-telecentric fashion, which may depend on the designed output of the chip, and may route it to the second group of optical elements, which may create a telecentric or non-telecentric output where each beam is focused to the required location with the appropriate magnification. FIG. 5 illustrates a plurality of optical elements at 510A-510K in optical relay assembly 500. In the illustrated embodiment, optical elements 510A-510K may be 11 lenses of various shapes, such as concave, convex, biconcave, biconvex, plano-convex, plano-concave, plano-convex, positive meniscus, or negative meniscus. In alternative embodiments, there may be more or less optical elements. The optical elements in the optical relay assembly 500 may be spherical, aspherical, toroidal, or diffractive in nature depending on the designed output of the photonic chip and the required characteristics of the light at the image plane. The optical elements may be anti-reflection coated or uncoated, and may be fabricated out of one or many materials to suit the requirements of the design. The total number of optical elements may vary to meet the design requirements. The system may be composed of all reflective elements, all refractive elements, or a combination of refractive and reflective elements.

The shape of the lenses in optical relay assembly 500 may be configured with a various number of lenses with various shapes in order to deliver beams to the atomic object confinement apparatus precisely and accurately in terms of position, spacings, mode profile, polarization, frequency, and phase.

As depicted in FIG. 5, there may only be one optical relay assembly 500 for a beam delivery photonic integrated circuit 400. For example, the optical relay assembly 500 may act as a relay assembly for each output 460 of beam delivery photonic integrated circuit 400 that provides a beam to the atomic object confinement apparatus 50. The beam delivery photonic integrated circuit 400 has outputs that are located in specific positions, which allows for beam outputs of the beam delivery photonic integrated circuit 400 to be known and for an optical relay assembly 500 to be configured based on the position of the outputs. In other embodiments, more than one optical relay assembly 500 may be used with a beam delivery photonic integrated circuit 400. In other embodiments, one optical relay assembly 500 may be used with more than one beam delivery photonics integrated circuit 400. In other embodiments, vacuum chamber 40 may also contain a plurality of optical elements (e.g., 45A, 45B).

Fabrication of a Beam Delivery Photonic Integrated Circuit

A beam delivery photonic integrated circuit 400 may be fabricated using photonic circuit fabrication techniques, which may include lithography. The use of lithographically defined geometry may allow for tighter tolerances, which may lead to greater stability in the quantum computer. A waveguide layer in a beam delivery photonic integrated circuit may be etched to form the desired waveguide geometry, including each of the splitters in the beam delivery photonic integrated circuit 400. With the process of FIG. 6, or variations of it, beam delivery photonic integrated circuit 400 may be fabricated on a single chip. Although the device fabrication described herein utilizes only one waveguide layer, integrated circuits can be made multi-level, including with splitters, couplers and/or waveguides enabling the delivery of multiple beam arrays with different wavelengths.

In various embodiments, a waveguide layer may be achromatic and may facilitate multiple wavelengths of light, such as broadband infrared light to ultraviolet light. In embodiments that use ultraviolet and visible lasers, which may be required for addressing atomic objects confined and/or trapped in an atomic object confinement apparatus, the device may be fabricated using specialty materials optimized for ultraviolet or visible light wavelengths. In some embodiments a waveguide layer may use a single mode waveguide. In other embodiments, a multimode waveguide layer may be used. In some embodiment, a first layer may be made of a first material and a second layer may be made of a second material.

FIG. 6 provides a flowchart illustrating various processes, procedures, and/or operations performed in fabricating a beam delivery photonic integrated circuit 400. FIGS. 7A-7T provide cross-sectional views of various stages of fabricating a beam delivery photonic integrated circuit 400.

At step 602 of FIG. 6, a first cladding layer 704 is deposited on the substrate 702 (e.g., Si), as shown in FIGS. 7A and 7B. For example, a first cladding layer 704 comprising oxide and/or dielectric (e.g., $SiO_2$) may be deposited on the substrate 702. In various embodiments, the first cladding layer 704 may electrically and/or thermally isolate the waveguide layer 706 from the substrate 702. FIG. 7A illustrates a cross-section before completion of step/operation 602, and FIG. 7B illustrates a cross-section after completion of step 602.

Continuing with FIG. 6, at step 604, a waveguide layer 706 is deposited onto the first cladding layer 704, as shown in FIG. 7C. The waveguide layer 706 may be thin film that is deposited. For example, a waveguide layer 706 comprising the material (e.g., a dielectric material, such as $Al_2O_3$, $Si_3N_4$, $HfO_2$, AlN, $Ta_2O_5$, and/or the like) of the passive waveguide layer 706 may be deposited onto the first cladding layer 704. FIG. 7C illustrates a cross-section after completion of step 604.

Returning to FIG. 6, at step 606, a hard mask layer 708 is deposited onto the waveguide layer 706. The hard mask layer may be of the same material as the first cladding layer 704 (e.g., SiO2), or it may be of a different material. For example, a hard mask layer 708 is deposited onto the waveguide layer 706. For example, FIG. 7D illustrates a cross-section after completion of step/operation 606.

Continuing with FIG. 6, at step 608, a resist layer 710, such as a photoresist, is added by spinning. For example, one or more drops of resist layer 710 material may be deposited on the surface of the hard mask layer 708 and the substrate 702 and layers deposited and/or bonded thereon may be spun at a high rate so that the one or more drops of resist layer 710 material become evenly dispersed across the surface of the hard mask layer 708. FIG. 7E illustrates a cross-section after completion of step 608. For example, a resist layer 710 is deposited onto the hard mask layer 708.

Returning to FIG. 6, at step 610, the resist layer 710 may be baked and then exposed to UV radiation to develop resist layer 710A. FIG. 7F illustrates a cross-section after completion of step 610.

Continuing with FIG. 6, at step 612, the hard mask layer 708 is etched to form hard mask layer 708A. In various embodiments, a photolithography and/or mask etching process may be used to etch the hard mask layer to form hard mask layer 708A. FIG. 7G illustrates a cross-section after completion of step 612.

Returning to FIG. 6, at step 614, the resist layer 710 is removed. FIG. 7H illustrates a cross-section after completion of step/operation 614.

Continuing with FIG. 6, at step 616, the waveguide layer 706 is etched and/or patterned to form waveguide layer 706A. FIG. 7I illustrates a cross-section after completion of step 616.

Continuing with FIG. 6, at step 618, a second cladding layer is deposited to form cladding layer 708B. FIG. 7J illustrates a cross-section after completion of step 618. Step 618 may, or may not, result in cladding being deposited such that the exposed surface at 708B requires smoothing or flattening. If the exposed surface is to be smooth or flattened, an optional polishing step may occur at step 620. For example, the exposed surface of the cladding layer 708B may be polished using chemical mechanical polishing (CMP) such that the exposed surface is smooth and/or flat to form cladding layer 7C. FIG. 7K illustrates a cross-section after completion of step 620. If the optional step 620 does not occur due to the exposed surface not needing to be smoothed or flattened, the process continues step 622 shown in FIG. 6.

At step 622, a metal layer may be deposited to form metal layer 712. For example, the metal layer may be made of a material (Al, Ti, Au, and/or the like), and the metal layer may define a Mach Zehnder interferometer heater element and/or its lead. FIG. 7L illustrates a cross-section after completion of step 622.

Continuing with FIG. 6, at step 624, a resist layer 714, such as a photoresist, is added by spinning. FIG. 7M illustrates a cross-section after completion of step 624.

Returning to FIG. 6, at step 626, the resist layer 714 is baked and exposed to UV radiation and to develop resist layer 714A. FIG. 7N illustrates a cross-section after completion of step 626.

Continuing with FIG. 6, at step 628, the metal layer 712 is etched to form metal layer 712A. For example, the metal layer 712 may be etched form a metal layer 712A that defines one or more Mach Zehnder interferometer heater elements, corresponding leads, and/or the like. FIG. 7O illustrates a cross-section after completion of step 628.

Returning to FIG. 6, at step 630, the resist layer 714A is removed. FIG. 7P illustrates a cross-section after completion of step/operation 630.

Continuing with FIG. 6, at step 632, a resist layer 716, such as a photoresist, is added by spinning. FIG. 7Q illustrates a cross-section after completion of step 632.

At step 634 shown in FIG. 6, the resist layer 716 is baked and exposed to UV radiation and to develop resist layer 716A. FIG. 7R illustrates a cross-section after completion of step 626.

Figure 7S:
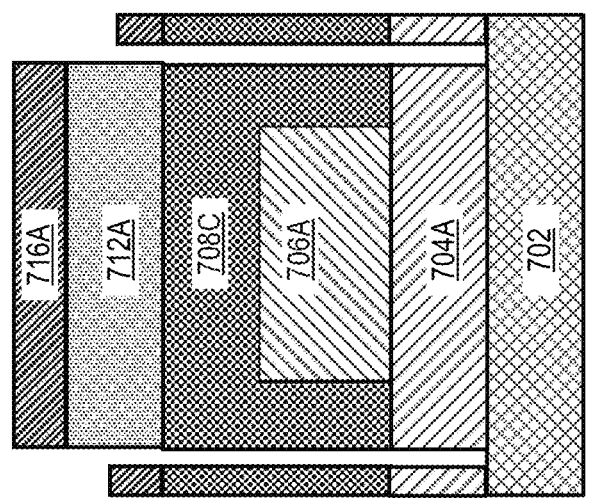

Returning to FIG. 6, at step 636, cladding layer 708B is etched to form cladding layer 708C and cladding layer 704 is etched to form cladding layer 704A. FIG. 7S illustrates a cross-section after completion of step 636.

Continuing with FIG. 6, at step 638, the resist layer 716A is cleaned and removed. FIG. 7T illustrates a cross-section of a beam delivery photonic integrated circuit 400 after completion of step 638.

After cleaning, an edge with the outputs of the beam delivery photonic integrated circuit 400 may be polished.

Technical Advantages

Various embodiments provide technical solutions to the technical problem of precisely and accurately, in terms of frequency, frequency offset, and/or phase, delivering multiple laser beams (e.g., ultraviolet laser beams, visible laser beams, infrared laser beams, etc.) in a dense array (e.g., to a dense array of atomic object confinement apparatus zones). In an embodiment, the array of atomic object confinement apparatus zones may be a one-or-two-dimensional array of zones within an atomic object confinement apparatus. The beam delivery photonic integrated circuit may be configured to deliver the laser beams so that they may be mutually parallel and correctly spaced to overlap with the atomic object confinement apparatus zones with submicron accuracy. Further, lithographically defined geometry of the waveguides provide greater stability. Additionally, a beam delivery photonic integrated circuit may be configured to provide more than one beam while being sized to fit in a mezzanine breadboard surrounding a vacuum chamber. A beam delivery photonic integrated circuit 400 on a single chip may also be easier to use in a quantum computing system compared to other waveguides that comprise multiple components (e.g., fiber optics, troughs holding fiber optics, couplers, splitters, interferometers, modulators, etc.), particularly when such components may occupy a large amount of space. Additionally, a beam delivery photonic integrated circuit 400 on a single chip allows the beam delivery photonic integrated circuit 400 to be placed closed to the vacuum chamber 40. Moreover, the alignment of the plurality of beams provided by a beam delivery photonic integrated circuit 400 is simpler than traditional means and does not increase in complexity and/or in the number of degrees of freedom with an increase in the number of outputs of the beam delivery photonic integrated circuit 400. In particular, various embodiments provide an improvement over traditional means, which may be collections of individual fibers, collimators, and mirrors for each beam, but these systems required a large footprint on the mezzanine breadboard. Further, these systems were limited in the degree to which they may scale by the amount of available space and ability to package the current laser-beam delivery apparatus.

Various embodiments of the beam delivery photonic integrated circuit 400 provide for a system allowing for delivery of a plurality of laser beams that may be power balanced and have a constant intensity at the <0.1% level. Embodiments therefore provide an improvement to the operation of a quantum computer.

Various embodiments also allow for tuning at once with six degrees of freedom without requiring the tuning of each individual beam, which allows for an increasing number of outputs without increasing complexity of alignment.

CONCLUSION

Many modifications and other embodiments of the invention set forth herein will come to mind to one skilled in the art to which the invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A beam delivery system comprising:
a beam delivery photonic integrated circuit comprising:
one or more optical inputs;
a plurality of waveguide outputs, wherein each of the plurality of waveguide outputs are tapered;
a plurality of beam paths, each beam path connecting one of the plurality of waveguide outputs to at least one of the one or more optical inputs,
wherein at least one of the plurality of waveguide outputs that is connected to a first optical input of the one or more optical inputs is directed to a photodetector configured to measure an intensity of the waveguide output directed to the photodetector,
wherein each of the plurality of beam paths connected to the first optical input comprises a respective optical element configured to provide a respective beam having a respective power that is substantially constant by removing power fluctuations from the respective beam provided via a respective waveguide output of the plurality of waveguide outputs based on the intensity of the waveguide output measured by the photodetector, and
wherein the beam delivery photonic integrated circuit is on a chip;
a telecentric optical relay assembly, the telecentric optical relay assembly configured to receive beams provided by at least two of the plurality of waveguide outputs and focus each received beam on a corresponding one of a plurality of positions of an atomic object confinement apparatus in a telecentric manner.

2. The beam delivery system of claim 1, wherein one or more beam paths of the plurality of beam paths comprises a respective optical element configured to tune a respective beam for at least one of frequency, phase, or intensity.

3. The beam delivery system of claim 1, wherein the atomic object confinement apparatus is disposed within a vacuum chamber and the beam delivery system comprises one or more optical elements disposed within the vacuum chamber.

4. The beam delivery system of claim 1, wherein the plurality of beam paths are defined lithographically.

5. The beam delivery system of claim 1, wherein the plurality of waveguide outputs are located on a polished edge of the beam delivery photonic integrated circuit.

6. The beam delivery system of claim 1, wherein each of the waveguide outputs are on one side of the beam delivery photonic integrated circuit and are parallel to each other.

7. The beam delivery system of claim 1, wherein each of the plurality of waveguide outputs are at most 150 micrometers from the next closest of the plurality of waveguide outputs.

8. The beam delivery system of claim 1, wherein the optical input is butt-coupled to an optical fiber providing an input beam.

9. The beam delivery system of claim 1, wherein the atomic object confinement apparatus is disposed within a vacuum chamber and the beam delivery photonic integrated circuit is disposed within the vacuum chamber.

10. A beam delivery system comprising:
a beam delivery photonic integrated circuit comprising:
a first waveguide layer and a second waveguide layer;
the first waveguide layer comprising:
a first optical input;
a plurality of first waveguide outputs, wherein the plurality of first waveguide outputs are tapered;
a plurality of first beam paths, each first beam path connecting one of the plurality of first waveguide outputs to the first optical input,
wherein at least one of the plurality of waveguide outputs that is connected to a first optical input of the one or more optical inputs is directed to a photodetector configured to measure an intensity of the waveguide output directed to the photodetector, and
wherein each of the plurality of beam paths connected to the first optical input comprise a respective optical element configured to provide a respective beam having a respective power that is substantially constant by removing power fluctuations from the respective beam provided via a respective waveguide output of the plurality of waveguide outputs based on the intensity of the waveguide output directed to the photodetector,
the second waveguide layer comprising:
a second optical input;
a plurality of second waveguide outputs, wherein the plurality of second waveguide outputs are tapered;
a plurality of second beam paths, each second beam path connecting one of the plurality of second waveguide outputs to the second optical input;
wherein the beam delivery photonic integrated circuit is on a chip;
a telecentric optical relay assembly, the telecentric optical relay assembly configured to receive beams provided by at least one of the plurality of first waveguide outputs and at least one of the plurality of second waveguide outputs, and the telecentric optical relay assembly further configured to focus each received beam on a corresponding plurality of positions of an atomic object confinement apparatus in a telecentric manner.

11. The beam delivery system claim 10, wherein the atomic object confinement apparatus is disposed within a vacuum chamber and the beam delivery system comprises one or more optical elements disposed within the vacuum chamber.

12. The beam delivery system claim 10, wherein one or more of the plurality of first beam paths or the plurality of second beam paths comprises an optical element configured to tune a beam for at least one of frequency, phase, or intensity.

13. The beam delivery system claim 10, wherein the plurality of first waveguide outputs and the plurality of second waveguide outputs are located on a polished edge of the beam delivery photonic integrated circuit.

14. The beam delivery system claim 10, wherein each of the plurality of first waveguide outputs and the plurality of second waveguide outputs are on one side of the beam delivery photonic integrated circuit and are parallel to each other.

15. The beam delivery system claim 10, wherein each of the plurality of first waveguide outputs are at most 150 micrometers from the next closest of the plurality of waveguide outputs.

16. The beam delivery system claim 10, wherein at least one of the first waveguide layer or the second waveguide layer comprises a dielectric material.

17. A beam delivery system comprising:
a beam delivery photonic integrated circuit comprising:
a plurality of optical inputs;
a plurality of waveguide outputs, wherein each of the plurality of waveguide outputs is tapered,
a plurality of beam paths, each beam path connecting one of the plurality of waveguide outputs to one of the plurality of optical inputs,
wherein at least one of the plurality of waveguide outputs that is connected to a first optical input of the one or more optical inputs is directed to a photodetector configured to measure an intensity of the waveguide output directed to the photodetector,
wherein each of the plurality of beam paths connected to the first optical input comprises a respective optical element configured to provide a respective beam having a respective power that is substantially constant by removing power fluctuations from the respective beam provided via a respective waveguide output of the plurality of waveguide outputs based on the intensity of the waveguide output directed to the photodetector,
wherein the beam delivery photonic integrated circuit is on a chip;
wherein the respective beam is provided via the respective waveguide output to a respective position of an atomic object confinement apparatus, and
wherein the atomic object confinement apparatus and the beam delivery photonic integrated circuit are disposed within a vacuum chamber.

18. The beam delivery system of claim 17, wherein one or more beam paths of the plurality of beam paths comprises a respective optical element configured to tune a respective beam for at least one of frequency, phase, or intensity.

19. The beam delivery system of claim 17, wherein the atomic object confinement apparatus is disposed within a vacuum chamber and the beam delivery system comprises one or more optical elements disposed within the vacuum chamber.

20. The beam delivery system of claim 17, wherein the plurality of beam paths are defined lithographically.

* * * * *

UNITED STATES PATENT AND TRADEMARK OFFICE
CERTIFICATE OF CORRECTION

PATENT NO. : 11,892,744 B2
APPLICATION NO. : 17/316354
DATED : February 6, 2024
INVENTOR(S) : Mary A. Rowe et al.

It is certified that error appears in the above-identified patent and that said Letters Patent is hereby corrected as shown below:

In the Claims

In Column 18, Line 1, Claim 11, delete "system" and insert -- system of --, therefor.

In Column 18, Line 6, Claim 12, delete "system" and insert -- system of --, therefor.

In Column 18, Line 11, Claim 13, delete "system" and insert -- system of --, therefor.

In Column 18, Line 15, Claim 14, delete "system" and insert -- system of --, therefor.

In Column 18, Line 21, Claim 15, delete "system" and insert -- system of --, therefor.

In Column 18, Line 25, Claim 16, delete "system" and insert -- system of --, therefor.

Signed and Sealed this
First Day of October, 2024

*Katherine Kelly Vidal*

Katherine Kelly Vidal
*Director of the United States Patent and Trademark Office*